United States Patent
Wiedrick et al.

(10) Patent No.: US 12,481,320 B2
(45) Date of Patent: Nov. 25, 2025

(54) SPRING-LOADED PIN STATUS DETECTION

(71) Applicant: Google LLC, Mountain View, CA (US)

(72) Inventors: Roth Kyle Wiedrick, Mountain View, CA (US); Scott Edmund Stanford, Mountain View, CA (US)

(73) Assignee: Google LLC, Mountain View, CA (US)

( * ) Notice: Subject to any disclaimer, the term of this patent is extended or adjusted under 35 U.S.C. 154(b) by 261 days.

(21) Appl. No.: 18/197,485

(22) Filed: May 15, 2023

(65) Prior Publication Data

US 2023/0393621 A1    Dec. 7, 2023

Related U.S. Application Data

(60) Provisional application No. 63/347,693, filed on Jun. 1, 2022.

(51) Int. Cl.
  *G01R 1/067* (2006.01)
  *G01R 15/20* (2006.01)
  *G06F 1/16* (2006.01)

(52) U.S. Cl.
  CPC ........... *G06F 1/1632* (2013.01); *G01R 15/20* (2013.01)

(58) Field of Classification Search
  CPC ..................................................... G01R 15/20
  See application file for complete search history.

(56) References Cited

U.S. PATENT DOCUMENTS

2021/0026409 A1 *   1/2021   Miles ..................... F16M 13/02
2022/0407515 A1 * 12/2022   Bruwer ................. H03K 17/952

FOREIGN PATENT DOCUMENTS

JP          S59 205821 A     11/1984
WO     WO-2004102370 A2 *   11/2004   ............... G01L 1/14
WO          2021/081570 A1   4/2021

* cited by examiner

*Primary Examiner* — Alesa Allgood
(74) *Attorney, Agent, or Firm* — Kilpatrick Townsend & Stockton LLP

(57) ABSTRACT

Arrangements herein are directed to pin state detection systems and arrangements for using such systems. A pin detection system can include a pin. The pin can be in one of multiple states, such as a depressed state and an undepressed state. The system can include a transmit coil and a receive coil that encircles the pin. The system can also include a processing system that causes a transmit signal to be transmitted to the transmit coil. The processing system can analyze a signal received from the receive coil to determine a state of the pin.

18 Claims, 11 Drawing Sheets

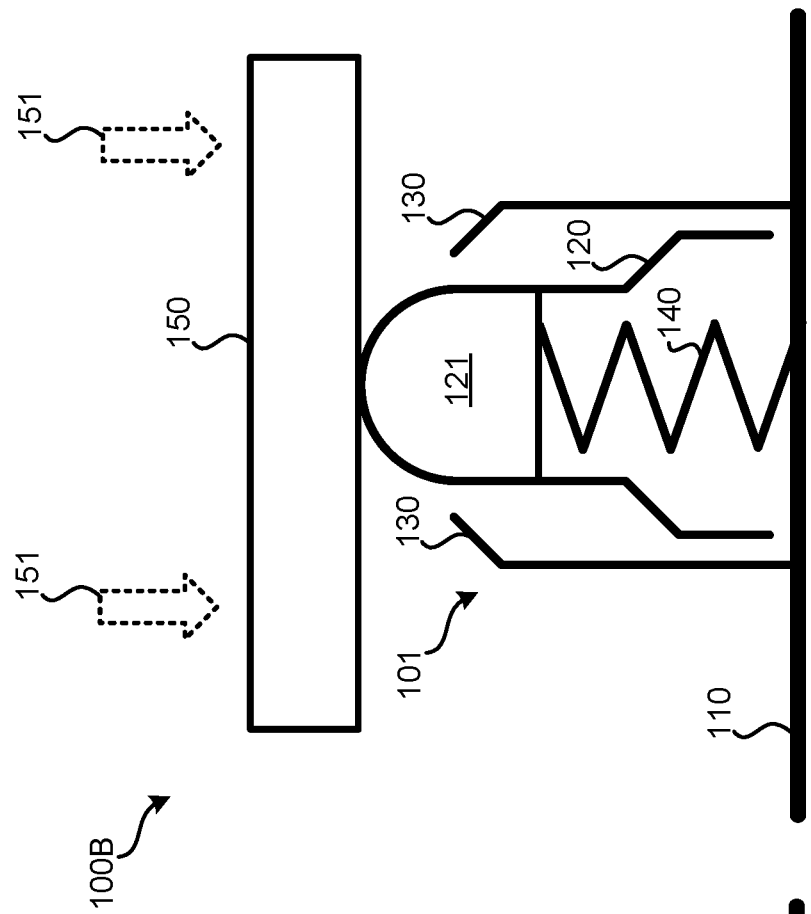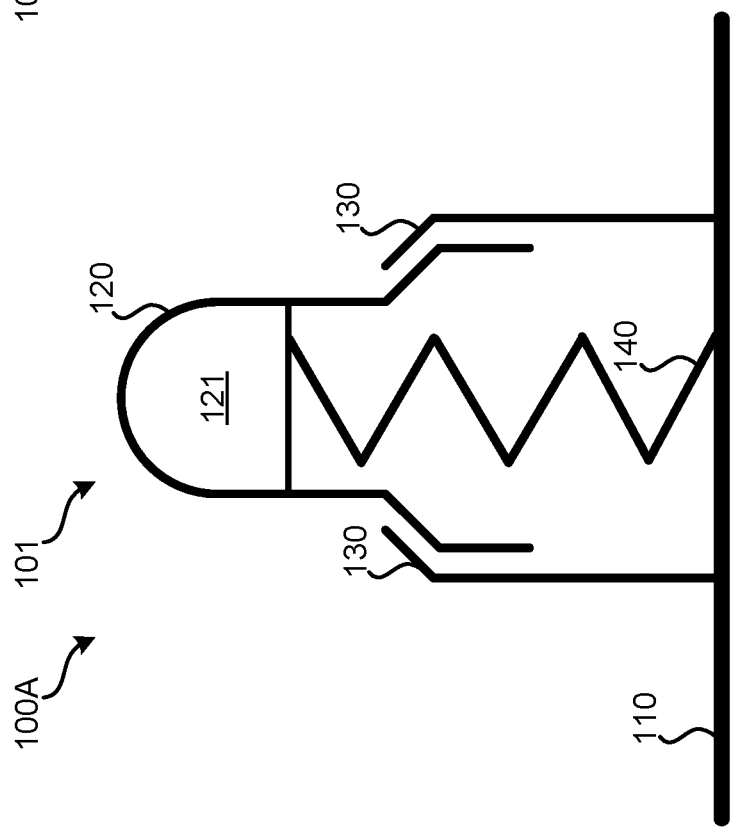

SPRING-LOADED PIN STATUS DETECTION

CROSS-REFERENCES TO RELATED APPLICATIONS

This Application claims priority to U.S. Provisional Patent Application No. 63/347,693, filed on Jun. 1, 2022, entitled "Spring-Loaded Pin Status Detection," the entire disclosure of which is hereby incorporated by reference for all purposes.

BACKGROUND

Many devices and systems use spring-loaded pins to transfer data, power, or both between two devices, such as a device and a dock. Typically, a dock will have some number of spring-loaded pins which depress when pressure is applied. The pressure serves to ensure that a continuous electrical connection between a pin and a corresponding pad remains present while the device and the dock are docked together.

While a depth sensor could be used to determine if a pin is depressed, typically for simplicity of manufacturing and cost, depth sensors may be avoided. To determine that the device and dock have docked, one or more pins or pads may be monitored for the presence of a power signal, data signal, or both. If power and/or data is present, the device, dock, or both can detect that the two devices have been successfully docked together. However, if the pads and the spring-loaded pins are partially misaligned, a user may think that the devices have been successfully docked, but no transfer of power or data may be possible due to the misalignment. Therefore, one or more pins of a first device may be depressed but not be in contact with the corresponding one or more pads of a second device. Such an arrangement can result in end-user frustration and power and/or data not being transferred as expected by the user.

Embodiments detailed herein allow for the depression of one or more pins to be detected without electrical continuity with pads of another device.

SUMMARY

Various embodiments are described related to a pin state detection system. In some embodiments, a pin state detection system is described. The system may comprise a first pin. The first pin may be in one of a plurality of states. The plurality of states may comprise a depressed state and an undepressed state. The system may comprise a transmit coil that encircles the first pin. The system may comprise a receive coil that encircles the first pin. The system may comprise a pin state processing system, comprising one or more processors. The pin state processing system may be configured to cause a transmit signal to be transmitted to the transmit coil. The pin state processing system may be configured to receive a signal from the receive coil. The pin state processing system may be configured to determine a state of the first pin based on the received signal. The state may be selected from the plurality of states.

Embodiments of such a system may include one or more of the following features: a second pin. The second pin may be in one of the plurality of states. The transmit coil may encircle the second pin. The receive coil may encircle the second pin. The determined state may be for the first pin and the second pin. The transmit coil and the receive coil may be coiled around the first pin such that the transmit coil and the receive coil have no electrical continuity with the first pin. The system may further comprise a printed circuit board (PCB). The transmit coil and the receive coil may be printed on different layers of the PCB. The system may further comprise a PCB. The transmit coil and the receive coil may be printed on a same layer of the PCB. The transmit coil and the receive coil may be the same coil. The plurality of states may further comprise a partially depressed state. The first pin may comprise a bottom metallic shell. The first pin may comprise a top metallic shell. The first pin may comprise a spring. When pressure is applied to the top metallic shell, the top metallic shell may cause the spring to depress and the top metallic shell at least partially depresses into the bottom metallic shell. The pin state processing system being configured to determine the state of the first pin based on the received signal may comprise comparing a current or a voltage of the received signal to a stored threshold value.

In some embodiments, a method for detecting a state of a pin is described. The method may comprise outputting a transmit signal to a transmit coil. The transmit coil may encircle a first pin. The method may comprise receiving a signal from a receive coil. The receive coil may encircle the first pin. The method may comprise determining the state of the first pin based on the received signal. The state may be selected from a plurality of states. The plurality of states may comprise a depressed state and an undepressed state.

Embodiments of such a method may include one or more of the following features: determining that electrical continuity between the first pin and a corresponding contact pad of a separate device may not be present. The method may further comprise in response to determining that the state of the first pin is the depressed state and that electrical continuity between the first pin and the corresponding contact pad of the separate device is not present, performing an action. The action may be causing a message to be output by the separate device indicative of electrical continuity between the first pin and the corresponding contact pad of the separate device not being present. The method may further comprise receiving a trigger to check a status of the first pin. Outputting the transmit signal may be based on the trigger being received. The transmit coil and the receive coil encircle a second pin and the determined state may be for the first pin and the second pin. The transmit coil and the receive coil may be formed by traces on a printed circuit board (PCB). The first pin may comprise a bottom metallic shell. The first pin may comprise a top metallic shell. The first pin may comprise a spring. When pressure is applied to the top metallic shell, the top metallic shell causes the spring to depress and the top metallic shell may slide into the bottom metallic shell. Determining the state of the first pin based on the received signal may be based on measuring a voltage of the received signal at a defined time after the transmit signal is output.

In some embodiments, a tablet docking system is described. The system may comprise a tablet computer. The system may comprise a dock that is configured to removably attach with the tablet computer using a plurality of magnets, the dock comprising a pin state detection system. The pin state detection system may comprise a first pin. The first pin can be in one of a plurality of states, the plurality of states may comprise a depressed state and an undepressed state. The system may comprise a transmit coil that encircles the first pin. The system may comprise a receive coil that encircles the first pin. The system may comprise a pin state processing system, comprising one or more processors. The pin state processing system may be configured to cause a transmit signal to be transmitted to the transmit coil. The system may be configured to receive a signal from the receive coil. The system may be configured to determine a state of the first pin based on the received signal. The state may be selected from the plurality of states. The system may be configured to, based at least in part on determining that the first pin is depressed but electrical continuity is not present, output an indication of misalignment of the tablet computer with the dock.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 1A illustrates an embodiment of an undepressed spring-loaded pin.

FIG. 1B illustrates an embodiment of a depressed spring-loaded pin.

DETAILED DESCRIPTION

Figure 2:
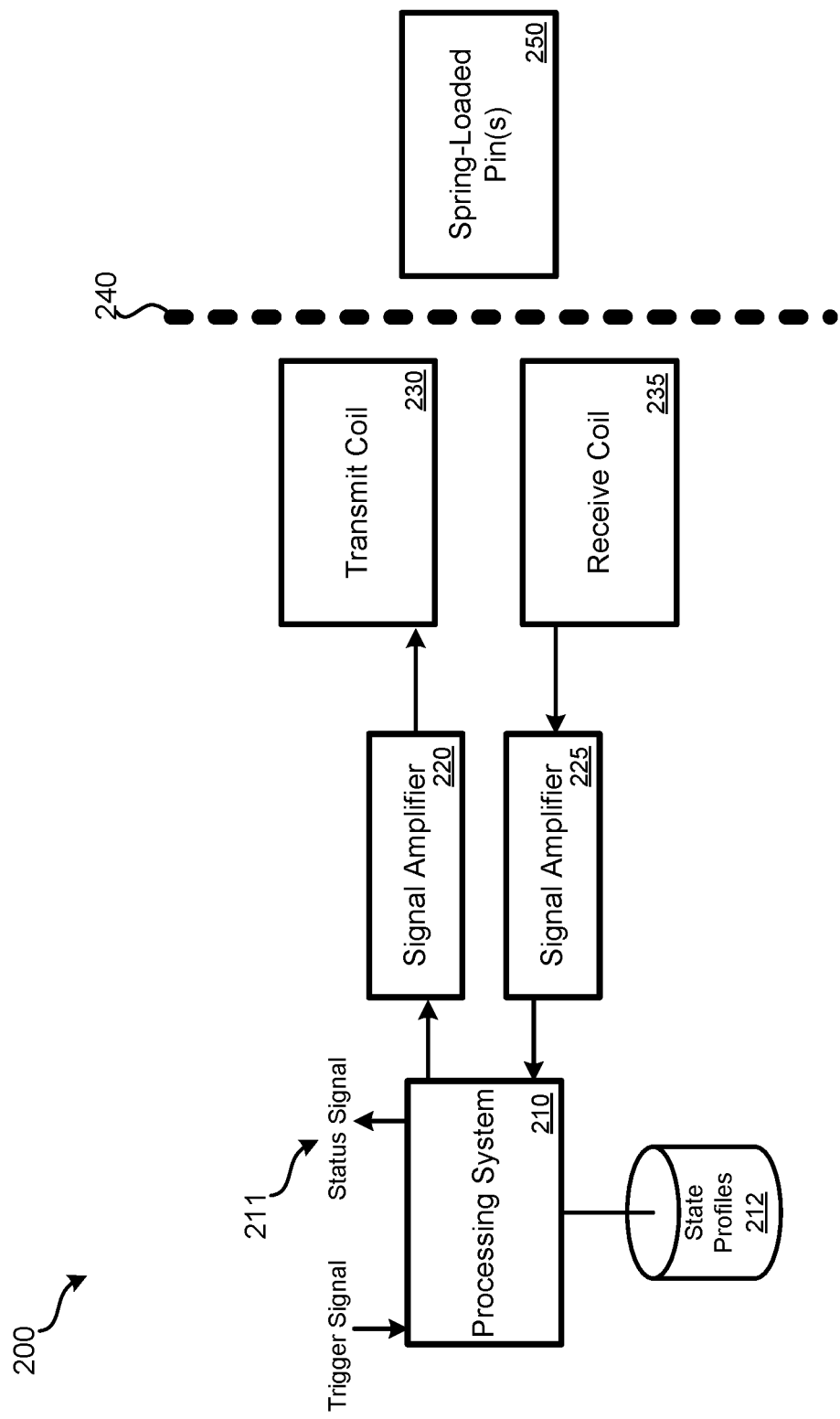
FIG. 2 illustrates a block diagram of an embodiment of a pin state detection system.

Embodiments detailed herein allow for the state of one or more pins to be detected without relying on electrical continuity with electrical connectors, such as pads, of some other device. The ability to detect whether one or more pins are fully or partially depressed without relying on electrical continuity with one or more pads of some other device can have advantages. Detecting depressed pins through which power or data cannot be transmitted (or received) can be indicative of two devices being misaligned for docking. For example, if magnets are used to assist in docking between the devices, the magnets may have caused the devices to attract to each other in an undesired orientation, resulting in the inability of the devices to communicate with each other, transmit power between the devices, or both. Additionally or alternatively, detecting depressed pins through which power or data cannot be transmitted (or received) can be indicative of a foreign object being in proximity to or interfering with one or more pins.

If the depression of pins is detected but the one or more pins are not mated with the correct corresponding one or more pads, a user may be notified that docking between the two devices should be retried or, for example, the pins and associated pads should be inspected and cleaned. In some embodiments, the devices themselves may be able to physically realign in response to such a determination, such as by activating or deactivating one or more electro-permanent magnets.

FIGS. 1A and 1B illustrate cross-sections of embodiments of an undepressed and depressed spring-loaded pin, respectively. In embodiment 100A of FIG. 1A, spring-loaded pin 101 is attached to printed circuit board (PCB) 110. PCB 110 may include one or multiple layers. In other embodiments, spring-loaded pin 101 may be attached with some other form of substrate. Spring-loaded pin 101 can include: top shell 120; bottom shell 130; and spring 140. Top shell 120 and bottom shell 130 may be metallic. Spring 140 may also be metallic. Top shell 120 is shaped such that it can be at least partially depressed into bottom shell 130. Force exerted upwards by spring 140 is sufficient to keep top shell 120 extended from bottom shell 130 when force is not applied to a top of top shell 120. The shape of top shell 120 and bottom shell 130 is such that top shell 120 cannot be readily removed from bottom shell 130. In variations of spring-loaded pin 101, other components may be present, such as a ball within spring-loaded pin 101.

In embodiment 100B of FIG. 1B, object 150 is exerting force downward (as indicated by arrows 151) onto top shell 120. This force is sufficient to overcome the force of spring 140 being exerted in the opposite direction. In response to the force, top shell 120 is at least partially depressed a distance into bottom shell 130 such that top shell 120 slides at least partially into bottom shell 130. An effect of this depression is that contact is maintained between object 150 and top shell 120 due at least in part to force being exerted upward by spring 140. Therefore, for example, if object 150 includes an electrical contact (e.g., an electrical pad), electrical continuity can be maintained between top shell 120 and object 150.

Whether electrical continuity is present between spring-loaded pin 101 and another device or not, when spring-loaded pin 101 is depressed such that top shell 120 is depressed within bottom shell 130 and spring 140 is depressed, a greater amount of metal is closer to the substrate (in this example, PCB 110) than when spring-loaded pin 101 is undepressed. For example, cap 121 located at a top of top shell 120, may be solid metal. This greater amount of metal being present close to PCB 110 can affect a magnetic field that is induced nearby. By inducing a magnetic field near spring-loaded pin 101 and measuring electrical current induced by the magnetic field, a determination can be made as to whether spring-loaded pin 101 is in a depressed state or undepressed state. In other embodiments, a partial depression of spring-loaded pin 101 can also be detected. (It should be noted that other metal may be present nearby spring-loaded pin 101, such as on PCB 110 or another device that is attempting to mate with spring-loaded pin 101. While such other metal can affect the magnetic field, the change in magnetic field by the spring-loaded pin 101 can remain significant enough such that the pin's state can be accurately detected based on how the magnetic field is altered and affects the electrical current induced in receive coil.)

While FIGS. 1A and 1B are focused on spring-loaded pins, other forms of metallic pins may have their state detected using the embodiments detected herein if the pin, when depressed, affects a magnetic field differently from when the pin is undepressed. Accordingly, the systems and methods detailed herein can be applied to types of pins different from spring-loaded pin 101.

FIG. 2 illustrates a block diagram of an embodiment of a pin state detection system 200 ("system 200"). System 200 can include: processing system 210; state profiles 212; signal amplifier 220; signal amplifier 225; transmit coil 230; and receive coil 235. Also present can be one or more spring-loaded pins 250. As detailed herein, system 200 can be used to sense the position of one or more than one spring-loaded pins; for simplicity, this description will refer to spring-loaded pin 250 in the singular.

Processing system 210 may include one or more special-purpose or general-purpose processors. Such special-purpose processors may include processors that are specifically designed to perform the functions of the components detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random-access memory (RAM), flash memory, a hard disk drive (HDD), or a solid-state drive (SSD). Further, processing system 210 can include one or more digital to analog converters (DACs) and one or more analog-to-digital converters (ADCs).

Processing system 210, based on a trigger signal received from another component or as determined by processing system 210 itself, can sense a position of spring-loaded pin 250. In some embodiments, processing system 210 periodically checks the status of spring-loaded pin 250. In other embodiments, such as in response to a wireless signal received from another device, processing system 210 may be triggered to check the status of spring-loaded pin 250. A waveform can be output by processing system 210 to signal amplifier 220. In some embodiments, the waveform output may be a square-wave pulse. In other embodiments, a different waveform may be output, such as a sinusoidal waveform. Signal amplifier 220, if present, can amplify the waveform and transmit the amplified waveform to transmit coil 230.

Transmit coil 230 may be a coil that induces a magnetic field. In some embodiments, transmit coil 230 has between five and twenty turns. Transmit coil 230 may be arranged so as to encircle a base of spring-loaded pin 250. For example, transmit coil 230 may be a trace arranged in a circular, oval, "D", or square pattern around a base of spring-loaded pin 250. In some embodiments, rather than encircling the base of spring-loaded pin 250, transmit coil 230 may be located to a side of the base of spring-loaded pin 250, but may still be used to create a magnetic field used to detect the state of the spring-loaded pin 250. In other embodiments, transmit coil 230 could be a helical coil that makes up or is embedded in bottom shell 130. Further detail regarding the arrangement of transmit coil 230 and spring-loaded pin 250 is provided in relation to FIGS. 3, 4, and 6. In some embodiments, more than one transmit coil may be present.

When the amplified waveform output by signal amplifier 220 is present in transmit coil 230, a magnetic field in the vicinity of transmit coil 230 is created. Since at least some of the components of spring-loaded pin 250 are metallic, the magnetic field created by the amplified waveform passing through transmit coil 230 is altered by the presence of spring-loaded pin 250. The waveform will be altered differently depending on whether spring-loaded pin 250 is undepressed, fully depressed, or partially depressed.

Receive coil 235 may also be a coil that is used to sense the magnetic field induced using transmit coil 230. In some embodiments, receive coil 235 has between five and twenty turns. Receive coil 235 can also be arranged so as to encircle a base of spring-loaded pin 250. Receive coil 235 may be a trace arranged in a circular, oval, "D", or square pattern around a base of spring-loaded pin 250. In some embodiments, rather than encircling the base of spring-loaded pin 250, receive coil 235 may be located to a side of the base of spring-loaded pin 250, but may still be used to sense the state of the spring-loaded pin 250. In other embodiments, receive coil 235 could be a helical coil that makes up or is embedded in bottom shell 130. Further detail regarding the arrangement of receive coil 235 and spring-loaded pin 250 is provided in relation to FIGS. 3, 4, and 6. In some embodiments, more than one receive coil may be present.

Line 240 graphically indicates that in some embodiments transmit coil 230 and receive coil 235 are not in physical or direct electrical contact with spring-loaded pin 250. Rather, only indirect electrical effects may be detected via a magnetic field. Whether spring-loaded pin 250 is in direct electrical contact or not with another device may not affect the sensing performed using system 200.

When a magnetic field is induced by the amplified waveform signal passing through transmit coil 230, the magnetic field, as altered by the presence and state of spring-loaded pin 250, induces a current in receive coil 235. This induced current is passed to signal amplifier 225, which amplifies the signal. Signal amplifier 220 and signal amplifier 225 may be part of a same amplifier package or incorporated as part of a system on a chip (SOC) that includes an ADC, DAC, and one or more processors.

The amplified received signal may be passed from signal amplifier 225 to processing system 210. Processing system 210 can then analyze the received signal to determine a state of spring-loaded pin 250. The amplitude of the current (or voltage) can be measured and compared to a threshold value. Depending on whether the amplitude is above or below the threshold value, spring-loaded pin 250 may be determined to be in an extended or unextended state. One or more additional thresholds may be used to determine if spring-loaded pin 250 is in an intermediary state, such as partially depressed.

In some embodiments, rather than just using an amplitude measurement, one or more state profiles 212 may be used. Each stored profile may indicate the expected response to be received from signal amplifier 225 over time based on the state of spring-loaded pin 250. A pin state mapped to the most closely matching profile from state profiles 212 may be selected based on a comparison between the output of signal amplifier 225 and the stored state profiles. For example, a machine learning model (e.g., a neural network) may be trained to classify a pin state based on an input of the signal received via receive coil 235. In addition or in alternate to using amplitude or amplitude over time of current or voltage, phase differences between the output waveform and the received signal can be measured and compared to one or more threshold values to determine the state of spring-loaded pin 250.

After determining the state of spring-loaded pin 250, processing system 210 can perform an action, such as outputting a status signal. The status signal can indicate the state of spring-loaded pin 250. In some embodiments, status signal 211 indicates that processing system 210 has determined that spring-loaded pin 250 is depressed, but no electrical continuity is present—which can be indicative of the spring-loading pin not being properly aligned with an electrical connector of a device with which docking is being attempted. In other embodiments, the status signal indicates the pin state and another component assesses whether the pin state should be addressed, either automatically or by a user.

Status signal 211 or a message created based on status signal 211 can be output to a user with the intent of triggering the user to take action. For example, status signal 211 can cause an electronic display of the device in which processing system 210 is installed or with which the device is in communication to present a message or output audio indicating that the user should check the spring-loaded pin, clean the spring-loaded pin, check for foreign bodies, realign the devices being docked, etc. In some embodiments, if spring-loaded pin 250 is depressed, but no electrical continuity is present, the status signal may be used to trigger an automatic realignment process to be attempted, such as by reversing the polarity of one or more electropermanent magnets.

Figure 7:
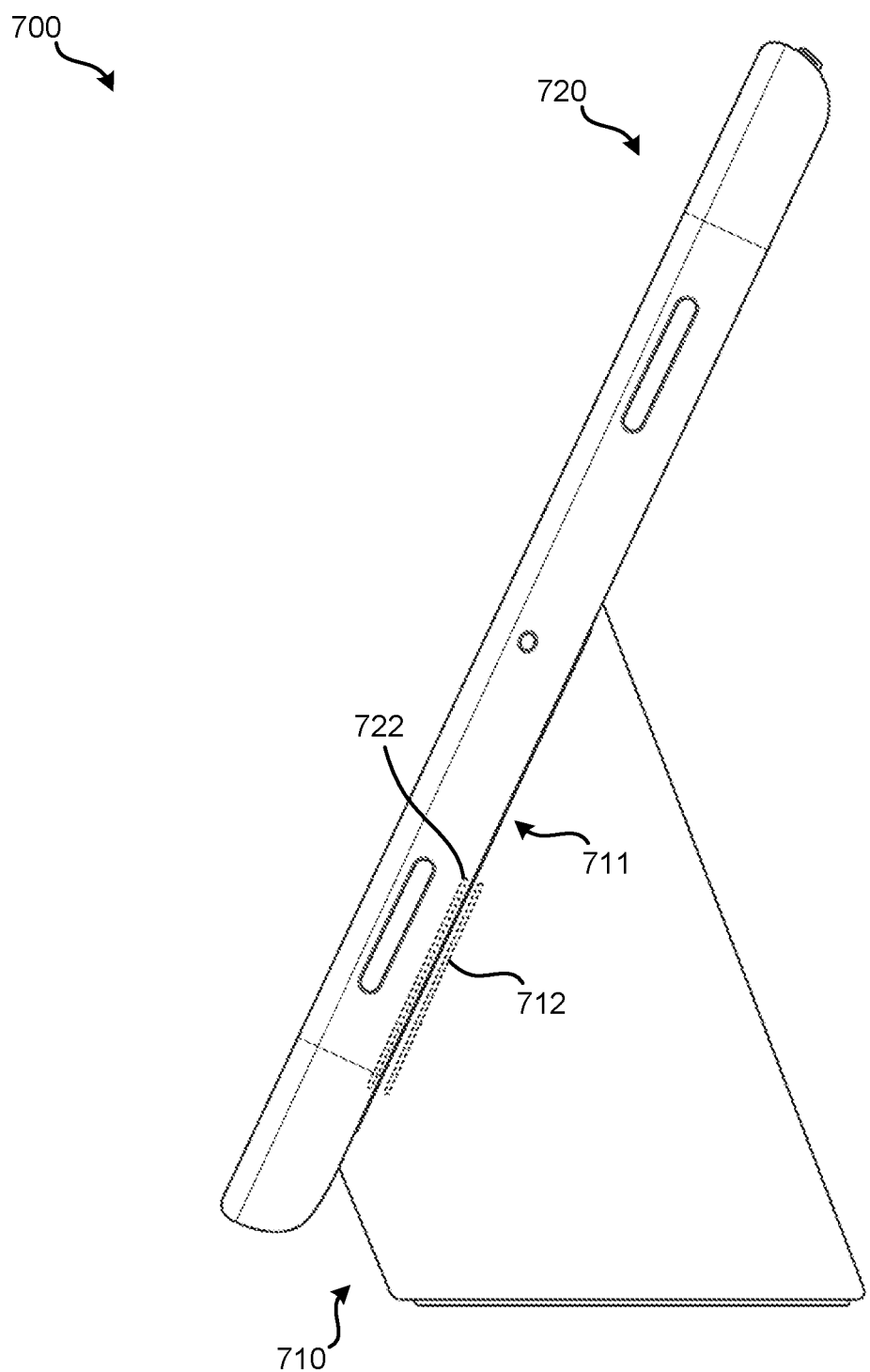
FIG. 7 illustrates an embodiment of a tablet and dock that can have an integrated pin state detection system.
Figure 8:
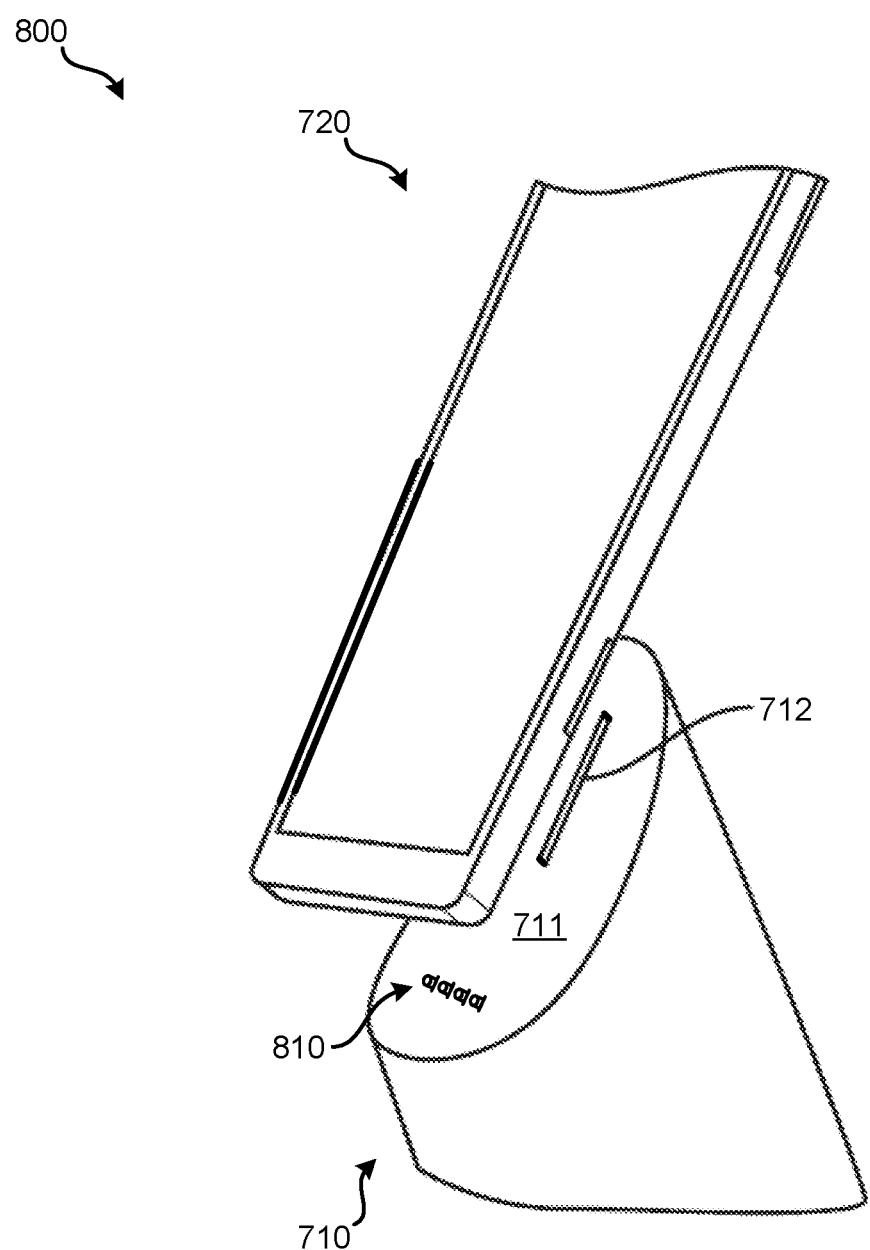
FIG. 8 illustrates an embodiment of a tablet and dock that can have an integrated pin state detection system, wherein the tablet is detached from the dock.
Figure 9:
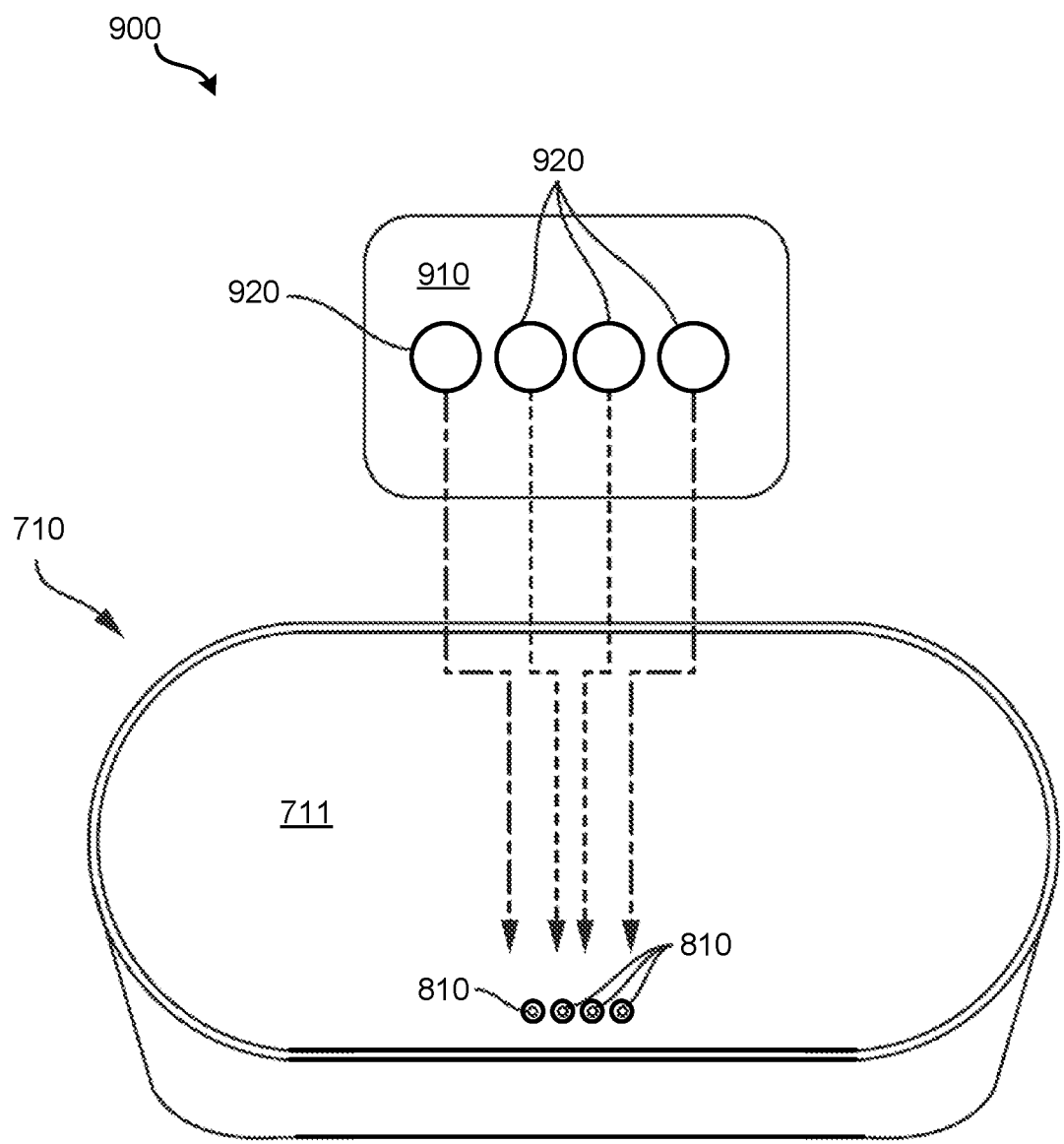
FIG. 9 illustrates a portion of a rear surface of a tablet computer which interfaces with a mating surface of a dock having spring-loaded pins and a spring-loaded pin detection system.

In some embodiments, system 200 is installed as part of a dock, as detailed in relation to FIGS. 7 through 9. The dock may have limited ways in which to communicate with a user; however, the device (e.g., tablet computer) that can be docked with the dock may have a way of outputting information to a user. Based on a status signal indicating that spring-loaded pin 250 is depressed but no electrical continuity is present, a wireless message may be sent to the tablet computer to present a message and/or output audio indicating that spring-loaded pin 250 is possibly misaligned with a corresponding electrical connector. In some embodiments, transmit coil 230 and/or receive coil 235 may be used to transmit a short-range message that can be received by a nearby device. This message can indicate the status of spring-loaded pin 250 or indicate related data, such as that spring-loaded pin 250 is depressed but no electrical continuity is present.

Figure 3:
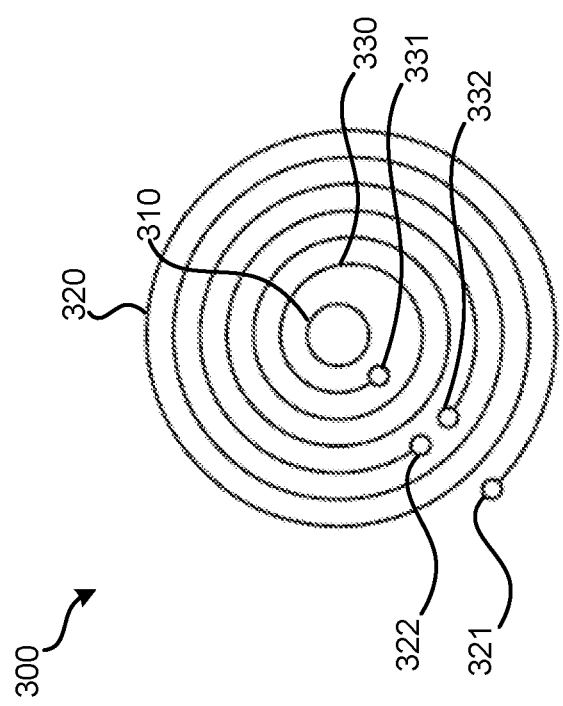
FIG. 3 illustrates an embodiment of a pin state detection system for a single pin.

FIG. 3 illustrates an embodiment of a pin state detection system 300 ("system 300") for a single pin. System 300 can include pin 310; transmit coil 320; and receive coil 330. Pin 310 can represent an embodiment of spring-loaded pin 250 of FIG. 2, spring-loaded pin 101 of FIGS. 1A and 1B, or some other form of pin for which its effect on a magnetic field changes depending on whether pin 310 is depressed, not depressed, or partially depressed.

In the illustrated embodiment of system 300, receive coil 330 is wrapped around a base of pin 310 without being in direct electrical contact. Receive coil 330 may have some number of windings around pin 310. In the illustrated embodiment, only three windings are shown. In other embodiments, between two and fifty windings may be present. As illustrated, the windings of receive coil 330 are approximately circular; in other embodiments, the windings may be generally rectangular, in a general "D" shape, or generally oval in shape, accounting for the spiral arrangements of the windings. Such windings can be made with wire or traces on a PCB. Other shapes are also possible, including helixes. Receive coil 330 may have two end-points, indicated by via 331 and via 332, which can allow for electrical connections to traces on another PCB layer. Via 331 and via 332 can allow for electrical connection with ground, a signal amplifier, and/or other circuitry.

Transmit coil 320 is wrapped around an outside of receive coil 330 without being in direct electrical contact with receive coil 330 (or pin 310). Transmit coil 320 may have some number of windings around pin 310. In the illustrated embodiment, only three windings are shown. In other embodiments, between two and fifty windings may be present. As illustrated, the windings of transmit coil 320 are approximately circular; in other embodiments, the windings may be generally rectangular, in a general "D" shape, or generally oval in shape, accounting for the spiral arrangements of the windings. Such windings can be made with wire or traces on a PCB. Other shapes are also possible, including helixes. Transmit coil 320 may have two end-points, indicated by via 321 and via 322, which can allow for electrical connections to traces on another PCB layer. In some embodiments, the end-points may not be made with vias, but rather may be a trace present on the same layer of the PCB that connects with another component. Vias 321 and via 322 can allow for electrical connection with ground, a signal amplifier, and/or other circuitry.

In the illustrated embodiment of system 300, transmit coil 320 and receive coil 330 are present on a same layer of a PCB. In some embodiments, transmit coil 320 may be proximate to pin 310, while receive coil 330 is coiled around transmit coil 320. In some embodiments, transmit coil 320 and receive coil 330 are located on different layers of a PCB, thus allowing transmit coil 320 and receive coil 330 to overlap as viewed from the top or bottom, but be present on separate layers. Such an arrangement can save space on a PCB.

Figure 4:
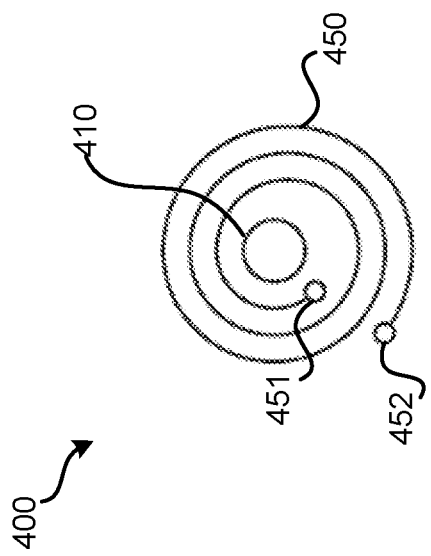
FIG. 4 illustrates another embodiment of a pin state detection system for a single pin.

In some embodiments, a single coil is present. FIG. 4 illustrates an embodiment of a pin state detection system 400 ("system 400") for a single pin in which a single coil is used for transmission and reception. Referring to FIG. 2, signal amplifier 220 and signal amplifier 225 may be connected with a single coil. In system 400, a waveform is output to coil 450. For instance, a pulse as illustrated in FIG. 4 may be output to coil 450. After the pulse has been output, the magnetic response of coil 450 is measured over time. The response measured will be different based on whether pin 410 is depressed or not. Coil 450 may have two end-points, indicated by via 451 and via 452, which can allow for electrical connections to traces on another PCB layer. Via 451 and via 452 can allow for electrical connection with ground, a signal amplifier, and/or other circuitry.

Figure 5:
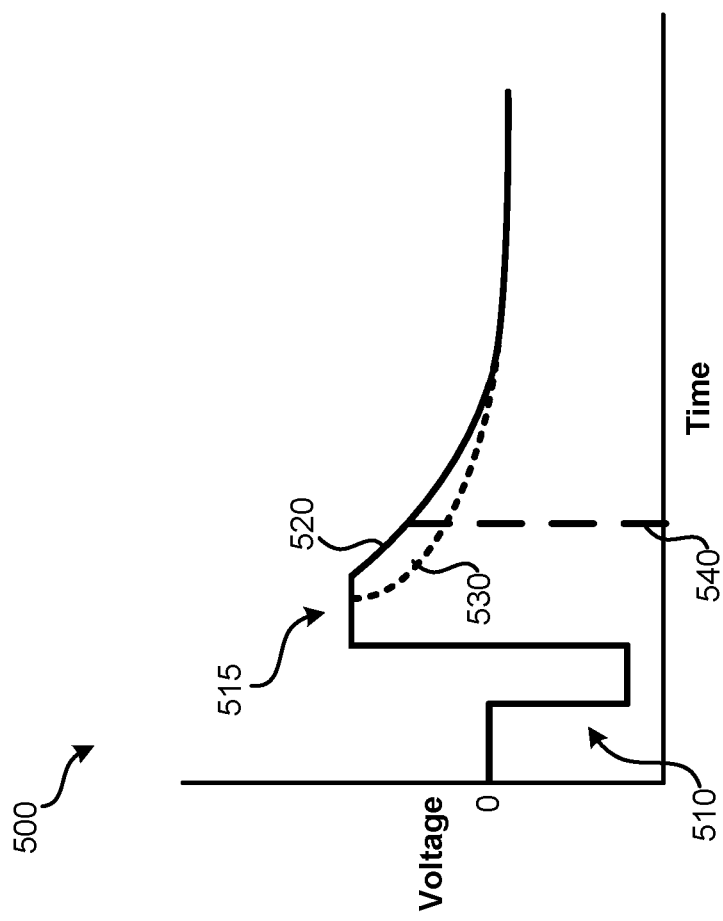
FIG. 5 illustrates an embodiment of a graph of voltage over time indicative of how a single coil can be used to both transmit and receive a signal for use in detecting a pin state.

FIG. 5 illustrates an embodiment of graph 500 of voltage over time indicative of how a single coil can be used to both transmit and receive. Graph 500 can represent voltage over time of when a pulse is applied to coil 450 of system 400 of FIG. 4. In graph 500, a pulse waveform 510 is driven on coil 450. Pulse waveform 510 can be a negative voltage for a period of time. When pulse waveform 510 ceases to be driven, a kick-back pulse 515 may be induced and affected by the magnetic response of metallic components nearby, including spring-loaded pin 410. As illustrated, measurement of kick-back pulse 515 has been clipped at a voltage, the magnitude of kick-back pulse 515 above the indicated clipped voltage may be insignificant since the voltage will be measured at pre-defined time 540. A filter circuit can be present and electrically connected with coil 450 to help eliminate ringing; the filter circuit may be a low-pass filter or a higher-order filter. This filter could be used in combination with a sample and hold circuit or an analog to digital converter with sample and hold functionality.

The decay of voltage over time in coil 450 is altered based on the effect pin 410 has on the magnetic field induced by pulse 510. For example, decay 520 can be indicative of when pin 410 is in a first state (e.g., undepressed) while decay 530 is indicative of when pin 410 is in a second state (e.g., depressed). By sampling the voltage of coil 450 at a predetermined time 540 (or some number of predetermined times) after pulse 510 was applied to coil 450, the measured voltage(s) can be used to discriminate between pin states. In the example of FIG. 5, a measurable voltage difference between pin states is present at predetermined time 540, thus allowing for discrimination among states based on measured voltage. In some embodiments, an integrator circuit can be used to discriminate between states, such as a boxcar integrator with an integration window around the zero-crossing point. The net integration output will change depending on the pin state. The measured voltage can be compared to a stored threshold value. A current measurement may be used in some embodiments instead of voltage.

Figure 6:
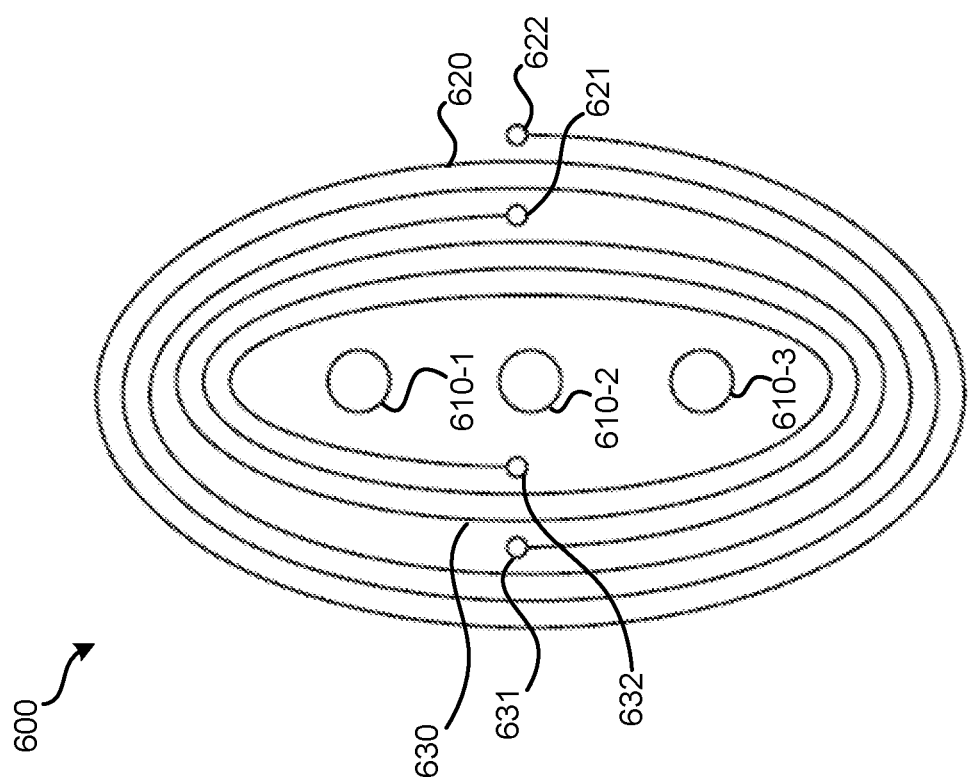
FIG. 6 illustrates an embodiment of a pin state detection system for multiple pins.

FIG. 6 illustrates an embodiment of a pin state detection system 600 ("system 600") for multiple pins. System 600 can include pins 610 (610-1, 610-2, 610-3); transmit coil 620; and receive coil 630. Pins 610 can represent embodiments of spring-loaded pin 250 of FIG. 2, spring-loaded pin 101 of FIGS. 1A and 1B, or some other form of pin for which its effect on a magnetic field changes when depressed or depressed. While the example of FIG. 6 details a three pin embodiment, the systems and techniques detailed herein can apply for arrangements involving two, four, or more than four pins.

In the illustrated embodiment of system 600, receive coil 630 is wrapped around an outside of the bases of pins 610 without being in direct electrical contact. Receive coil 630 may have some number of windings around pins 610. In the illustrated embodiment, only three windings are shown. In other embodiments, between two and fifty windings may be present. As illustrated, the windings of receive coil 630 are approximately oval (accounting for the spiral arrangement of the windings); in other embodiments, the windings may be generally rectangular, in a general "D" shape, or generally circular in shape, accounting for the spiral arrangements of the windings. Such windings can be made with wire or traces on a PCB; such traces may not necessarily be on a top layer of the PCB. Other shapes are also possible, including helixes. Receive coil 630 may have two end-points, indicated by via 631 and via 632, which can allow for connections to traces on another PCB layer. Via 631 and via 632 can allow for electrical connection with ground, a signal amplifier, and/or other circuitry.

Transmit coil 620 is wrapped around an outside of receive coil 630 without being in direct electrical contact with receive coil 630 (or pins 610). Transmit coil 620 may have some number of windings around pin 610. In the illustrated embodiment, only three windings are shown. In other embodiments, between two and fifty windings may be present. As illustrated, the windings of transmit coil 620 are approximately oval, accounting for the spiral nature of the windings; in other embodiments, the windings may be generally rectangular, in a general "D" shape, or generally oval in shape, accounting for the spiral arrangements of the windings. Such windings can be made with wire or traces on a PCB. Other shapes are also possible, including helixes. Transmit coil 620 may have two end-points, indicated by via 621 and via 622, which can allow for connections to traces on another PCB layer. In some embodiments, the end-points may not be made with vias, but rather may be a trace present on the same layer of the PCB that connects with another component. Vias 621 and via 622 can allow for connection with ground, a signal amplifier, and/or other circuitry.

In the illustrated embodiment of system 600, transmit coil 620 and receive coil 630 are present on a same layer of a PCB. In some embodiments, transmit coil 620 may be proximate to pins 610, while receive coil 630 is coiled around transmit coil 620. In some embodiments, transmit coil 620 and receive coil 630 are located on different layers of a PCB, thus allowing transmit coil 620 and receive coil 630 to overlap as viewed from the top or bottom, but be present on separate layers. Such an arrangement can save space on a PCB. In still other embodiments, a single coil may be used for both transmit and receive functions, as detailed in relation to FIGS. 4 and 5.

System 600 can be used to detect two or more states. In some embodiments, the two states include a no pins depressed state and a one or more pins depressed state. A general state that applies to all of the pins as a group may be sufficient. For example, detecting that all pins are undepressed, all are depressed, or one or more pins are depressed may be sufficient to trigger messaging to a user to correct the situation or triggering an automatic correction process. However, in some embodiments, it may be beneficial to detect a more precise state of the pins using system 600. If an accurate set of state profiles is created, it may be possible to detect the positions of discrete pins with more accuracy. For example, many states may be detected including: a particular pin being fully depressed; multiple pins (but not all pins) being fully depressed; all pins being fully depressed; a particular pin being partially depressed; multiple pins (but not all pins) being partially depressed; all pins being partially depressed; a combination of pins being fully and partially depressed; particular pins being undepressed, etc.

One beneficial aspect of system 600 is that a single pair of coils is used to detect the state of multiple pins. Since most electrical and communication systems that employ spring-loaded pins rely on multiple spring-loaded pins, an advantage of system 600 is that one instance of system 600 can be sufficient to detect the state of all pins of the system. In other embodiments, such as if a large number of pins are used, multiple instances of system 600 can be employed for different groups of pins. For example, if a device has 15 pins, five instances of system 600 could be used together to detect the state of all pins.

Various types of systems that include multiple devices that are to be removably docked together can use spring-loaded pins on one device along with corresponding electrical connectors on the other device. FIG. 7 illustrates an embodiment of system 700 that includes tablet computer 720 ("tablet 720") and dock 710 that can have an integrated pin state detection system as detailed herein. Dock 710 can include components such as: a power supply, a mating surface 711 that can support tablet 720; spring-loaded pins; a speaker; a microphone; and/or one or more status lights. Tablet 720 can include: a battery; a display (e.g., a touchscreen); one or more speakers; one or more microphones; one or more cameras; and electrical contacts. Tablet 720 and/or dock 710 can each include multiple magnets (e.g., present in region 712 and region 722) that can help align tablet 720 with dock 710 when a user is placing tablet 720 on dock 710 and hold tablet 720 in place against dock 710 while docked.

In system 700, dock 710 may be typically left in a particular location and connected with line power, such as via an electrical outlet. When placed on dock 710, electrical contacts (e.g., electrical pads) are intended to electrically connect with and at least partially depress spring-loaded pins. If tablet 720 is misaligned with dock 710, some or all of the spring-loaded pins may be fully or partially depressed, but electrical connection with the corresponding electrical connector of electrical contacts may not be present. The spring-loaded pin state detection system can be located in dock 710, assuming dock 710 has the spring-loaded pins. In other embodiments, it may be possible that the spring-loaded pin state detection system is present in tablet 720.

An embodiment of the pin state detection systems and methods, as detailed herein, can be used to identify the misalignment, inform the user, or trigger an automatic realignment process, such as realignment by engaging and/or disengaging one or more electropermanent magnets. If a message is to be presented to the user, since the improper alignment prevents spring-loaded pins 810 and electrical contacts of tablet computer 720 from being used for communication, a wireless message (e.g., a mesh networking protocol, Thread®, Bluetooth®, Wi-Fi®, etc.) may be transmitted from dock 710 to tablet 720. Once alignment is correct, power may be supplied to tablet 720 via spring-loaded pins. Functionality of dock 710 may also be utilized by tablet 720, such as a speaker of dock 710, which may be able to produce a higher fidelity sound than a speaker of tablet 720. Therefore, for example, analog or digital data may be transmitted via spring-loaded pins from tablet 720 to dock 710.

FIG. 8 illustrates an embodiment 800 of a tablet and dock that can have an integrated pin state detection system, wherein the tablet is detached from the dock. FIG. 8 can represent a situation where a user is about to attach tablet 720 with dock 710. Region 712 can represent a location of some number of magnets present on or near mating surface 711, which will help align tablet 720 on dock 710 properly. Visible in embodiment 800 are spring-loaded pins 810 present on mating surface 711 of dock 710. When docked, each of pins 810 may be intended to be in electrical contact with a particular electrical pad located on a rear surface of tablet 720. The number of spring-loaded pins 810 can be greater or fewer in other embodiments. Further, location of spring-loaded pins 810 is merely exemplary. One or more spring-loaded pin detection systems may be used to determine the states of one or more pins of spring-loaded pins 810.

FIG. 9 illustrates an embodiment 900 of a portion 910 of a rear surface of tablet computer 720 which interfaces with mating surface 711 of dock 710. Present on portion 910 are contact pads 920. Contact pads 920 include multiple conductive contact pads that are used to transfer data with and/or obtain power from the dock 710 when tablet computer 720 is docked. In various embodiments, the number of contact pads 920 is the same as the number of spring-loaded pins 810 located on mating surface 711 of dock 710. In various embodiments, the portion 910 of the tablet computer includes at least four contact pads 920 and dock 710 includes at least four spring-loaded pins 810, although any number of contact pads 920 and spring-loaded pins 810 may be used.

In some embodiments, an array of the spring-loaded pins 810 includes at least two outer spring-loaded pins and at least two inner spring-loaded pins. In other embodiments, the spring-loaded pins 810 may be arranged in a substantially vertical line or in any other physical arrangement on mating surface 711. In some embodiments, the at least two outer spring-loaded pins are associated with transferring data between the tablet computer and dock 710 and the at least two inner spring-loaded pins are used to provide power to the tablet computer. In other embodiments, the at least two inner spring-loaded pins are associated with transferring data and the at least two outer spring-loaded pins are used to provide power to the tablet computer.

Figure 10:
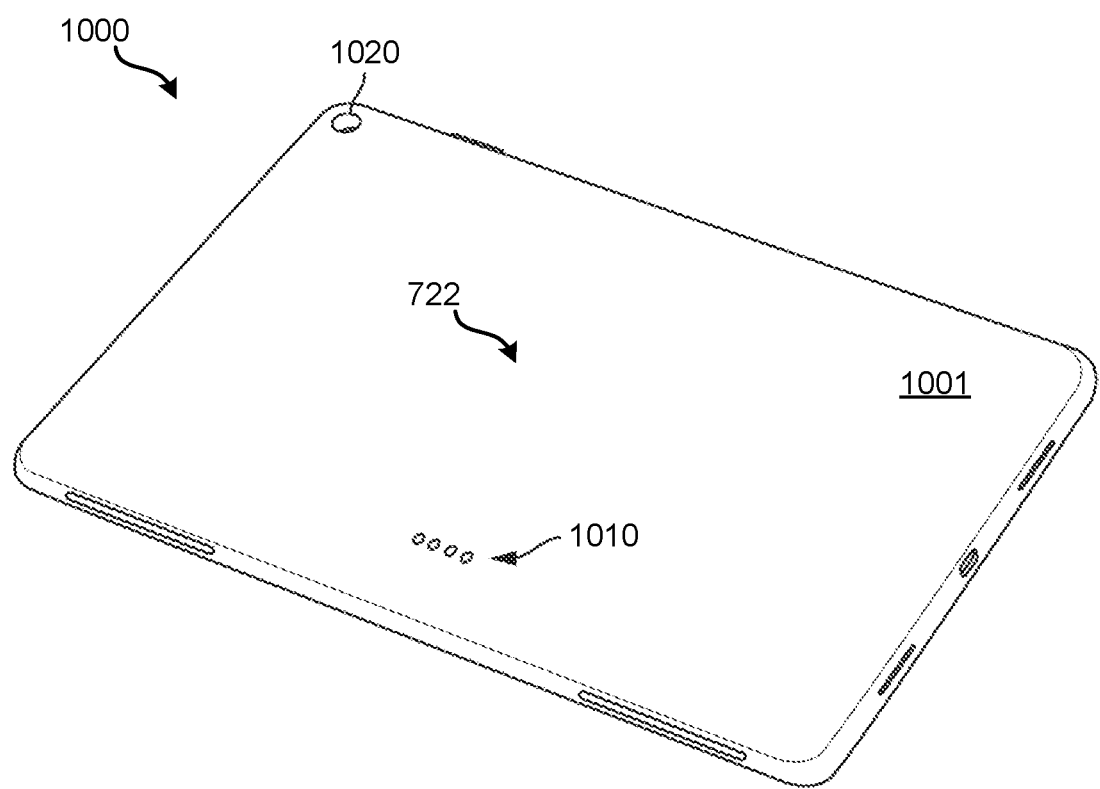
FIG. 10 illustrates an embodiment of tablet computer and dock system.

FIG. 10 illustrates an embodiment of tablet computer 1000 that is configured to dock with a dock using magnets and contact pads 1010 which contact spring-loaded pins 810. Tablet computer 1000 represents an embodiment of tablet computer 720 of FIG. 7. One or more magnets may be present within tablet computer 720 behind surface 1001. Tablet computer 1000 can include one or more conductive contact pads 1010 (e.g., metallic pads) that are used to transfer data with and/or obtain power from a dock when tablet computer 1000 is in a docked position on a dock, such as dock 710. As illustrated, four contact pads 1010 are present. In other embodiments, a greater or fewer number of contact pads 1010 may be present. The location of contact pads 1010 can also vary by embodiment. In other embodiments, rather than using contact pads, some other form of electrical contact may be used, such as spring-loaded pins (and an associated pin-state detection system), as detailed herein, or a combination of pads and pins. Other components, such as camera 1020, may be present on or accessible through rear surface 1001.

While FIGS. 7-10 illustrate a tablet computer and dock system on which embodiments of the spring-loaded pins and the associated spring-loaded pin state detection systems of FIGS. 1A-6 can be used, it should be understood that a spring-loaded pin state detection system can be used in various other types of electronics. For example, a smartphone charger system could include a spring-loaded pin state detection system. A gaming device dock could use a spring-loaded pin state detection system. An earbud charging case could use a spring-loaded pin state detection system. A smartwatch charging system could use a spring-loaded pin state detection system. A smart doorbell docking system could use a spring-loaded pin state detection system. Another example is a battery-powered flashlight being connected with a charging base. More generally, two computerized devices could use a spring-loaded pin state detection system. If the system using the pin state detection system does not have a way to display a message to a user, other ways of alerting the user may be used, such as flashing a light (e.g., the flashlight flashing), sound being output, or vibration being output. Alternatively, a wireless message could be transmitted to another device that has the ability to indicate misalignment, such as a message wirelessly transmitted to the tablet computer.

Figure 11:
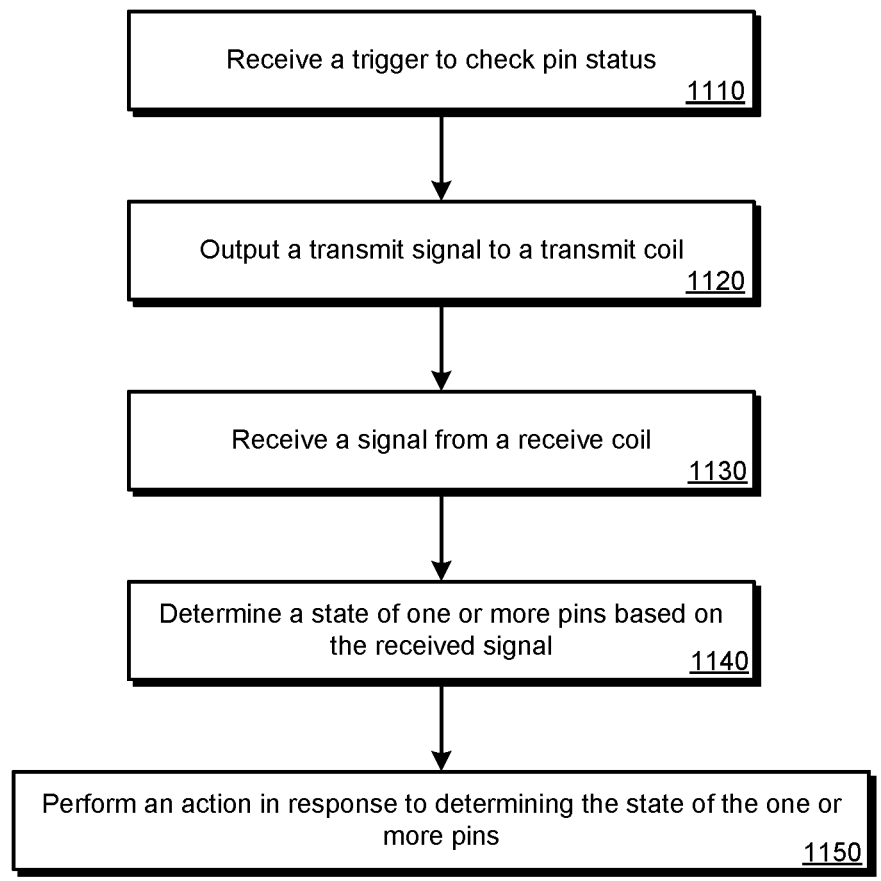
FIG. 11 illustrates an embodiment of a method for performing pin state detection.

Various methods may be performed using the systems and devices of FIGS. 1-10. FIG. 11 illustrates an embodiment of a method 1100 for performing pin state detection. Method 1100 can be performed for one pin or for a group of multiple pins. Method 1100 can be performed using system 200 of FIG. 2. Method 1100 can be used to detect the state of spring-loaded pin 101 of FIGS. 1A and 1B or some other form of depressible pin which affects a magnetic field differently when depressed as compared to undepressed. In some embodiments, method 1100 can be used to differentiate between two pin states: undepressed and depressed. In other embodiments, method 1100 can be used to differentiate between more than two pin states, such as: depressed, undepressed, and partially depressed. In some embodiments, a mismatch in states between pins can be detected, such as when two or more pins are being monitored, and one pin is depressed, but the other pin is undepressed.

At block 1110, a trigger to check pin status may be received. In some embodiments, the trigger is generated internally by the processing system of system 200 (e.g., based on a timer). In other embodiments, the trigger is received from an external source, such as a separate component of the device in which system 200 is incorporated.

At block 1120, an electrical transmit signal is output to the transmit coil. The transmit signal may be in the form of a waveform, such as a pulse, square wave, or sinusoidal wave. The transmit signal passing through the transmit coil may cause a magnetic field to be generated.

At block 1130, an electrical signal is received from a receive coil. The signal received from the receive coil may have been induced by the magnetic field generated at block 1120. One or more characteristics of the received electrical signal is affected by the state of the spring-loaded pin. That is, the spring-loaded pin affects the magnetic field generated at block 1120. The altered magnetic field causes an electrical signal to be induced in the receive coil, the electrical signal having one or more differing characteristics based on the state of the spring-loaded pin. The differing characteristics can include: amplitude, amplitude decay over time, and/or phase.

At block 1140, using the received signal from block 1130, a determination of a state of the spring-loaded pin can be made based on the one or more differing characteristics. Block 1140 can include a comparison being performed based on one or more characteristics with one or more threshold values. Block 1140 could instead include a comparison being performed between multiple stored profiles mapped to pin states and a profile created based on the received electrical signals of block 1130. For example, an amount of current induced over a period of time can be used to create a profile that is compared to a set of stored profiles to determine a most-closely matching profile. The state of the pin may be selected based on the state mapped to the most-closely matching profile.

A determination at block 1140 may be made that the pin is depressed or not depressed. If depressed, a further determination may be made as to whether electrical continuity is present. Determining whether electrical continuity is present can be based on a power or data signal being received via the pin. In other embodiments, method 1100 may only be performed if electrical continuity is not present. Therefore, in such embodiments, if the state of the pin is determined to be depressed at block 1140, it may have already been determined that electrical continuity is not present.

At block 1150, an action can be performed in response to determining the spring-loaded pin is depressed but not in electrical continuity with an electrical contact of another device. The action can include a message being output to a user, via an electronic display or via audio (e.g., synthesized or recorded speech) indicating an issue with the spring-loaded pin. The issue could be misalignment, a foreign body being present against the pin, or some other issue. In some embodiments, the action can include a message being wirelessly transmitted to another device for output via the other device's electronic display or via audio. In some embodiments, the action can involve an automated realignment process, such as by activating and/or disabling one or more electropermanent magnets in an attempt to realign the pin with a corresponding electrical connector of the device with which docking is intended. In some embodiments, in response to detecting misalignment, power and/or data may not be transmitted via the spring-loaded pins until the misalignment has been corrected. If the pins are determined to be depressed and in electrical continuity, a message or graphic may be output indicating proper docking (e.g., a graphic indicating that charging is occurring).

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known processes, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Now that several embodiments have been described, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A pin state detection system, comprising:
    a first pin, wherein the first pin can be in one of a plurality of states, the plurality of states comprising: a depressed state and an undepressed state;
    a transmit coil that encircles the first pin;
    a receive coil that encircles the first pin; and
    a pin state processing system, comprising one or more processors, the pin state processing system configured to:
        cause a transmit signal to be transmitted to the transmit coil;
        receive a signal from the receive coil;
        determine a state of the first pin based on the received signal, wherein the state is selected from the plurality of states;
        determine that electrical continuity between the first pin and a corresponding contact pad of a separate device is not present; and
        in response to determining that the state of the first pin is the depressed state and that electrical continuity between the first pin and the corresponding contact pad of the separate device is not present, perform an action.

2. The pin state detection system of claim 1, wherein the transmit coil and the receive coil are coiled around the first pin such that the transmit coil and the receive coil have no electrical continuity with the first pin.

3. The pin state detection system of claim 1, further comprising a printed circuit board (PCB), wherein the transmit coil and the receive coil are printed on different layers of the PCB.

4. The pin state detection system of claim 1, further comprising a PCB, wherein the transmit coil and the receive coil are printed on a same layer of the PCB.

5. The pin state detection system of claim 1, wherein the transmit coil and the receive coil are the same coil.

6. The pin state detection system of claim 1, wherein the plurality of states further comprises a partially depressed state.

7. The pin state detection system of claim 1, wherein:
    the first pin comprises:
        a bottom metallic shell;
        a top metallic shell; and
        a spring; and
    when pressure is applied to the top metallic shell, the top metallic shell causes the spring to depress and the top metallic shell at least partially depresses into the bottom metallic shell.

8. The pin state detection system of claim 1, wherein the pin state processing system being configured to determine the state of the first pin based on the received signal comprises comparing a current or a voltage of the received signal to a stored threshold value.

9. The pin state detection system of claim 1, further comprising:
    a second pin, wherein:
        the second pin can be in one of the plurality of states;
        the transmit coil encircles the second pin; and
        the receive coil encircles the second pin.

10. The pin state detection system of claim 9, wherein the determined state is for the first pin and the second pin.

11. A method for detecting a state of a pin, the method comprising:
    outputting a transmit signal to a transmit coil, wherein the transmit coil encircles a first pin;
    receiving a signal from a receive coil, wherein the receive coil encircles the first pin;
    determining the state of the first pin based on the received signal, wherein:
        the state is selected from a plurality of states, the plurality of states comprising: a depressed state and an undepressed state; and
        the state of the first pin is determined to be in the depressed state;
    determining that electrical continuity between the first pin and a corresponding contact pad of a separate device is not present; and
    in response to determining that the state of the first pin is the depressed state and that electrical continuity between the first pin and the corresponding contact pad of the separate device is not present, performing an action.

12. The method for detecting the state of the pin of claim 11, wherein the action is causing a message to be output by the separate device indicative of electrical continuity between the first pin and the corresponding contact pad of the separate device not being present.

13. The method for detecting the state of the pin of claim 11, further comprising:
    receiving a trigger to check a status of the first pin, wherein outputting the transmit signal is based on the trigger being received.

14. The method for detecting the state of the pin of claim 11, wherein the transmit coil and the receive coil encircle a second pin and the determined state is for the first pin and the second pin.

15. The method for detecting the state of the pin of claim 11, wherein the transmit coil and the receive coil are formed by traces on a printed circuit board (PCB).

16. The method for detecting the state of the pin of claim 11, wherein:
    the first pin comprises:
        a bottom metallic shell;
        a top metallic shell; and
        a spring; and
    when pressure is applied to the top metallic shell, the top metallic shell causes the spring to depress and the top metallic shell slides into the bottom metallic shell.

17. The method for detecting the state of the pin of claim 11, wherein determining the state of the first pin based on the received signal is based on measuring a voltage of the received signal at a defined time after the transmit signal is output.

18. A tablet docking system, comprising:
    a tablet computer;
    a dock that is configured to removably attach with the tablet computer using a plurality of magnets, the dock comprising a pin state detection system, the pin state detection system comprising:
        a first pin, wherein the first pin can be in one of a plurality of states, the plurality of states comprising: a depressed state and an undepressed state;
        a transmit coil that encircles the first pin;
        a receive coil that encircles the first pin; and
        a pin state processing system, comprising one or more processors, the pin state processing system configured to:
            cause a transmit signal to be transmitted to the transmit coil;
            receive a signal from the receive coil;
            determine a state of the first pin based on the received signal, wherein the state is selected from the plurality of states; and
            based at least in part on determining that the first pin is depressed but electrical continuity is not present, output an indication of misalignment of the tablet computer with the dock.

* * * * *